United States Patent
Lin et al.

(10) Patent No.: US 8,521,475 B2
(45) Date of Patent: Aug. 27, 2013

(54) DETECTING AND RECORDING PERFORMANCE EVENTS IN A DATA PROCESSING SYSTEM

(75) Inventors: Guohui Lin, Beijing (CN); Qiang Liu, Beijing (CN); Yudong Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 12/442,841

(22) PCT Filed: Sep. 17, 2007

(86) PCT No.: PCT/EP2007/059781
§ 371 (c)(1),
(2), (4) Date: Mar. 24, 2010

(87) PCT Pub. No.: WO2008/037616
PCT Pub. Date: Apr. 3, 2008

(65) Prior Publication Data
US 2010/0191508 A1    Jul. 29, 2010

(30) Foreign Application Priority Data
Sep. 27, 2006 (CN) .......................... 2006 1 0139391

(51) Int. Cl.
*G06F 11/30* (2006.01)
*G06F 19/00* (2011.01)

(52) U.S. Cl.
USPC ............ 702/186; 702/182; 702/183; 702/184

(58) Field of Classification Search
USPC ................................................ 702/182–190
See application file for complete search history.

(56) References Cited

U.S. PATENT DOCUMENTS

| 5,388,233 A * | 2/1995 | Hays et al. ..................... 712/208 |
| 5,857,110 A * | 1/1999 | Sakakibara et al. .............. 712/2 |
| 5,991,708 A | 11/1999 | Levine et al. |
| 6,021,457 A * | 2/2000 | Archer et al. ................. 710/260 |
| 6,341,357 B1 | 1/2002 | Ravichandran |
| 6,460,107 B1 | 10/2002 | Rao et al. |
| 6,742,143 B2 | 5/2004 | Kaler et al. |

(Continued)

FOREIGN PATENT DOCUMENTS
WO  WO0182085 A2  11/2001

OTHER PUBLICATIONS

MPX: Software for multiplexing hardware performance counters in multithreaded programs.

*Primary Examiner* — Phuong Huynh
(74) *Attorney, Agent, or Firm* — Tutunjian & Bitetto, P.C.; Preston Young

(57) ABSTRACT

A method and apparatus in a data processing system. The apparatus includes a performance event record generation component for generating a performance event record according to the system clock for a performance event monitored in the data processing system and a performance event record storage component for storing the performance event record generated by the performance event record generation component. The method in a data processing system according to the present invention includes the steps of: generating a performance event record based on the system clock for a performance event monitored in the data processing system; storing the generated performance event record; and arbitrating the storage conflict when multiple performance event records are generated at the same time in the step of generating a performance event record, in order to determine the storage order of the performance event records.

18 Claims, 9 Drawing Sheets

(56) References Cited

U.S. PATENT DOCUMENTS

| | | | |
|---|---|---|---|
| 6,775,640 B1* | 8/2004 | Swanson et al. | 702/182 |
| 7,984,273 B2* | 7/2011 | Sprangle et al. | 712/225 |
| 2002/0073255 A1 | 6/2002 | Davidson et al. | |
| 2003/0125907 A1* | 7/2003 | Saint-Hilaire et al. | 702/186 |
| 2006/0155516 A1* | 7/2006 | Johnson et al. | 702/186 |
| 2007/0294054 A1* | 12/2007 | Mericas | 702/186 |
| 2008/0183430 A1* | 7/2008 | Kitsunai et al. | 702/186 |

\* cited by examiner

DETECTING AND RECORDING PERFORMANCE EVENTS IN A DATA PROCESSING SYSTEM

TECHNICAL FIELD

The present invention relates to a data processing system, and in particular, to an apparatus and method for detecting and recording performance events in a data processing system.

BACKGROUND OF THE INVENTION

Within a state-of-the-art processor, a function is often provided which enables the processor to count the occurrences of performance events in the data processing system and to time the execution of processes within the data processing system, etc. Such a function is known as the performance monitoring of the processor, and is implemented by a performance monitoring system in the processor.

In a data processing system comprising such a processor, most of occurring performance events can be counted by one or more counters in the performance monitoring system of the processor. Such a counter comprises a plurality of bit fields, and its operation is managed by a control register in the processor. Generally, such a control register and counters both can be read and written by software in the data processing system. Therefore, by using the software to write a corresponding value into the control register, the user can select the type of performance events to be monitored in the data processing system and specify the activation conditions for the counter for counting this type of performance events.

In the U.S. Pat. No. 5,555,748, entitled "Method and system for performance monitoring within a data processing system", is disclosed a performance monitoring system, an schematic structure of which is shown in FIG. 1. As shown, the performance monitoring system comprises a multiplexer 14 and a performance event incrementer 10. The multiplexer 14 is configured to receive on lines 16 a plurality of performance event signals from various locations in the circuitry to be monitored in the data processing system. In addition, a mode_select signal on a line 15 is configured to determine which performance event signals in the plurality of performance event signals may be transmitted through the multiplexer 14 to the performance event incrementer 10. The performance event incrementer 10 is configured to, under being triggered by the selected performance event signals, count the occurrences of the performance events to which the performance event signals correspond. That is, the performance event signal is transmitted through the multiplexer 14 on a control line 20, so that the performance event incrementer 10 can count the occurrences of the performance events to which the performance event signals correspond.

In particular, in the performance event incrementer 10, a multiplexer 12 receives as inputs the value of a register 11 on a line 18 and the value incremented by an incrementer logic 13 on a line 17. Thus, when the selected performance event signal on the line 20 is high (logical "one"), the multiplexer 12 transmits the signal on the line 17 to the register 11. At this point, the input on the line 17 is equal to the value of the output of the register 11 incremented by 1 through the incrementer logic 13. Therefore, the final output of the register 11 on a line 19 represents the final counting value of the performance incrementer 10. This value is equal to the total occurrences of the performance events monitored in the data processing system.

In summary, in the performance monitoring system as shown in FIG. 1, for a specified time slice, only performance event count incrementing is triggered by the monitored performance event signals, thus only statistical data of the performance events is provided for use by a performance analysis tool in the data processing system in analyzing the behavior of the system. However, in scenarios where the performance analysis tool performs performance analysis and debugging for a multithread application, for example, the timestamp of each time-related performance event is also a very important information. Thus, in order to track a specific performance event within a specific time slice, not only the performance events themselves, but also the timestamps of the performance events should be recorded for use by the performance analysis tool in event analysis. Further, for most data processing systems, there are generally multiple thousands of events occurring within a time period intended for event analysis, and if the performance monitoring system as shown in FIG. 1 is employed, sufficient event counters would be needed to track all the events, which is apparently not feasible.

In addition, in the U.S. Pat. No. 6,775,640, entitled "Performance adder for tracking occurrence of events within a circuit", is disclosed a performance monitoring system, comprising a signal detection logic circuit for tracking various types of performance event signals in the circuitry to be monitored. FIG. 2 shows a schematic structure of such a signal detection logic circuit. As shown, the signal detection logic circuit 50 comprises event type logic blocks: an atomic logic block 45, an edge logic block 46 and a toggle or on/off logic block 47. For example, a signal 0 on a line 51 is transmitted to the atomic logic 45 for atomic signal detection, to the edge logic block 46 for edge signal detection, and to the toggle or on/off logic block 47 for toggle or on/off signal detection. Then the performance event signals generated by each of the atomic logic, edge logic and toggle or on/off logic are transmitted to the multiplexer 43. The multiplexer 43 is controlled by a type_select signal on a line 44 for selecting the type (atomic, edge or toggle) of the performance event signal to be transmitted to a multiplexer 37, which then can selectively transmit the selected performance event signal to a performance event incrementer 10 in a next stage which is not shown.

If a signal detection logic circuit as shown in FIG. 2 is employed, for each signal line in the circuitry to be monitored, such a specific signal detection logic and a type selection register for controlling the multiplexer would need to be provided. However, among these signal detection logic circuits, only the signal detection logic circuit for the signal line selected by the multiplexer 37 is in operation at a time, thus causing a tremendous waste of resources. Further, the signal detection logic circuit further cannot track multiple bit signals associated, such as those representing the status of the processor, so that the detection of a performance event generated by a combination of multiple bit signals can not be realized.

SUMMARY OF THE INVENTION

In view of the above problems in the prior art, the present invention is proposed, the purpose of which is to provide an apparatus and method for detecting and recording performance events in a data processing system that addresses one or more of the problems described above.

According to an aspect of the present invention, there is provided a performance event recording apparatus in a data processing system, comprising: a performance event record generation component for generating a performance event record according to a system clock for a performance event monitored in the data processing system; and a performance event record storage component for storing the performance event record generated by the performance event record generation component. The apparatus further comprises a conflict arbitration component for arbitrating the storage conflict when said multiple performance event record generation components store their generated performance event records into the performance event record storage component at the same time, in order to determine the storage order of the performance event records of these performance event generation component.

According to another aspect of the present invention, there is provided a performance event detection apparatus in a data processing system, comprising: a signal line selection component for selecting a signal line to be detected in the data processing system; and a performance event detection component for detecting performance events on the selected signal line, and for activating the corresponding performance event signal on detection of a performance event to notify the performance event recording apparatus in the data processing system.

According to another aspect of the present invention, there is provided a multiple bit performance signal combination apparatus in a data processing system, comprising: a mask register for determining the performance signal bits effective for the detection of performance events in the multiple bit performance signals through its configurable value; a mode register for determining a combination mode for the multiple bit performance signals through its configurable value; a logical AND component for performing a logical AND operation on the value of the mask register and the value of the multiple bit performance signals, and for performing a logical AND operation on the value of the mask register and the value of the mode register; and a comparison logic component for comparing the result of the logical AND of the value of the mask register and the value of the multiple bit performance signals, and the result of the logical AND of the value of the mask register and the value of the mode register to determine whether they are equal, and for outputting a corresponding single-bit signal based on the comparison result.

According to another aspect of the present invention, there is provided a performance event monitoring system in a data processing system, comprising: said performance event detection apparatus in a data processing system for detecting performance events on a signal line selected to be monitored, and for activating a corresponding performance event signal on detection of the occurrence of a performance event to notify the performance event recording apparatus; and said performance event recording apparatus in the data processing system for generating a performance event record for a performance event detected by the performance event detection apparatus.

According to another aspect of the present invention, there is provided a performance event recording method in a data processing system, comprising: generating a performance event record according to a system clock for a performance event monitored in the data processing system; and storing the generated performance event record.

According to another aspect of the present invention, there is provided a performance event detection method in a data processing system, comprising: selecting a signal line to be detected in the data processing system; and detecting performance events on the selected signal line, and activating the corresponding performance event signal on detection of a performance event for recording the performance event.

According to another aspect of the present invention, there is provided a multiple bit performance signal combination method in a data processing system, comprising: configuring a mask for determining the performance signal bits effective in the multiple bit performance signals and a combination mode for the multiple bit performance signals; performing a logical AND operation on the mask value and the value of the multiple bit performance signals; performing a logical AND operation on the mask value and the mode value; and comparing the logical AND result of the mask value and the value of the multiple bit performance signals, and the logical AND result of the mask value and the mode value to determine whether they are equal, and outputting a corresponding single bit signal based on the comparison result.

According to another aspect of the present invention, there is provided a performance event monitoring method in a data processing system, comprising: detecting performance events on a signal line selected to be monitored by using said performance event detection method in the data processing system, and activating the corresponding performance event signal on detection of the occurrence of a performance event; and generating a performance event record for the performance event detected by using said performance event recording method in the data processing system.

BRIEF DESCRIPTION OF THE DRAWINGS

Embodiments of the invention will now be described by way of example only and with reference to the accompanying drawings in which.

PREFERRED EMBODIMENTS OF THE INVENTION

First, a performance event monitoring system and its various components in a data processing system of the present invention will be described in detail.

Figure 1:
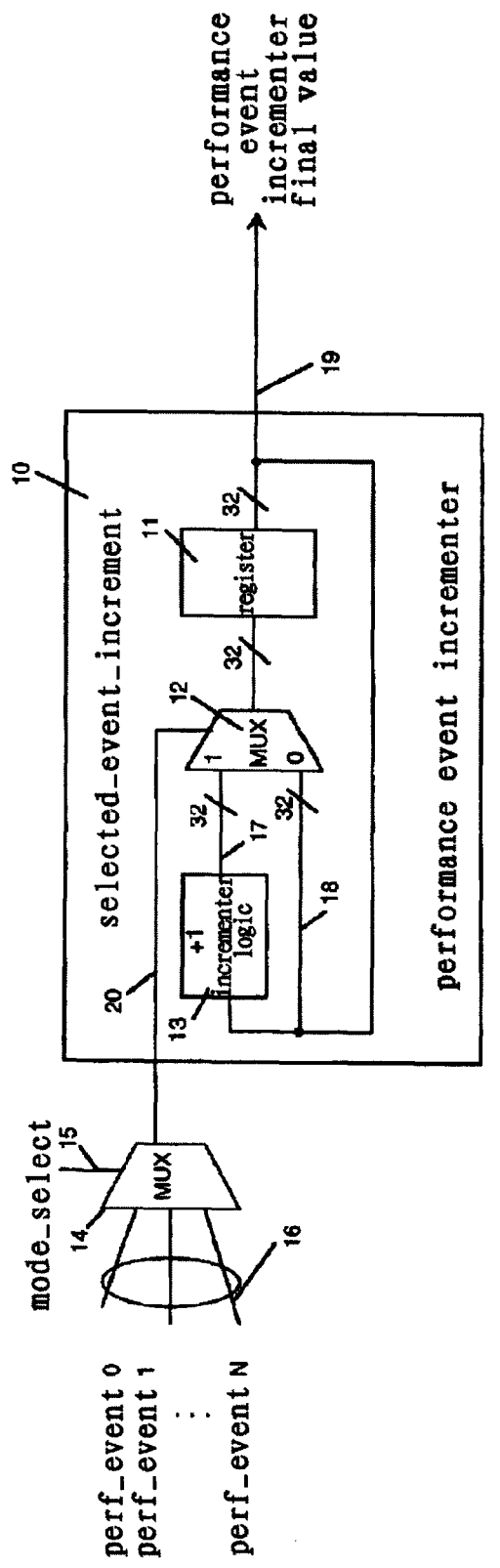
FIG. 1 is a schematic block diagram of a prior art performance monitoring system in a data processing system.
Figure 2:
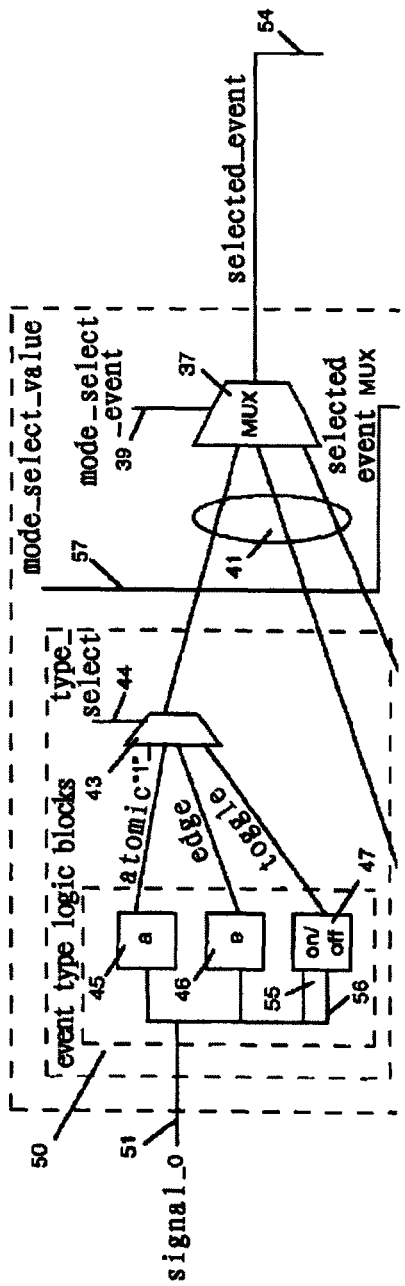
FIG. 2 is a schematic block diagram of a prior art signal detection logic circuit in a data processing system.
Figure 3:
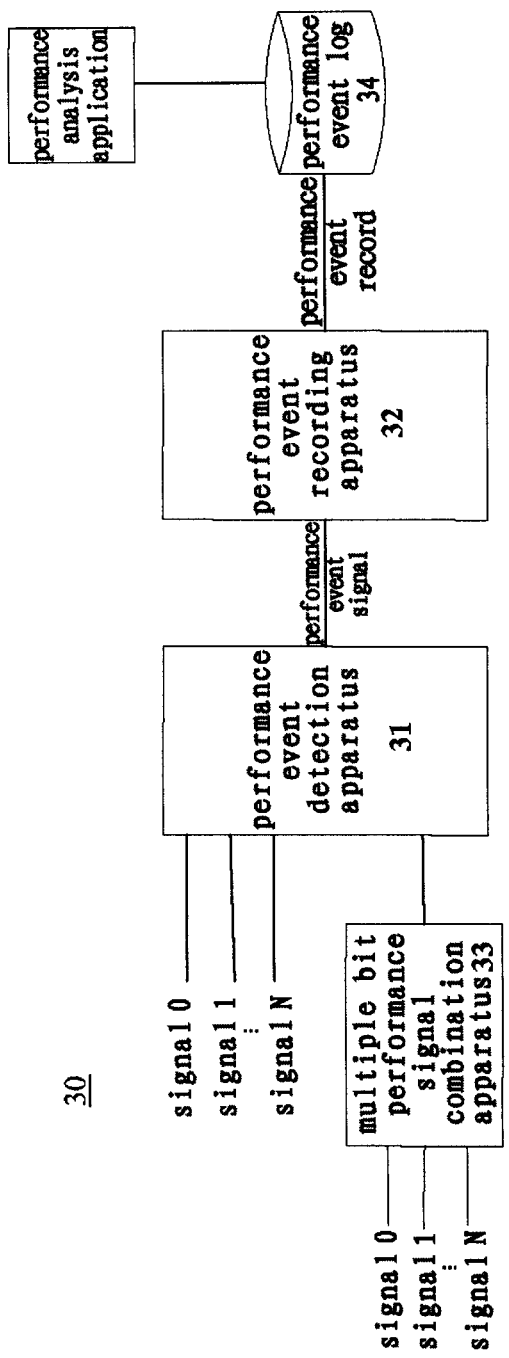
FIG. 3 is a schematic block diagram of a performance event monitoring system in a data processing system according to an embodiment of the present invention.

FIG. 3 is a schematic block diagram of a performance event monitoring system in a data processing system according to an embodiment of the present invention. As shown in FIG. 3, the performance event monitoring system in a data processing system of this embodiment comprises at least a performance event detection apparatus 31 and performance event recording apparatus 32.

Figure 4:
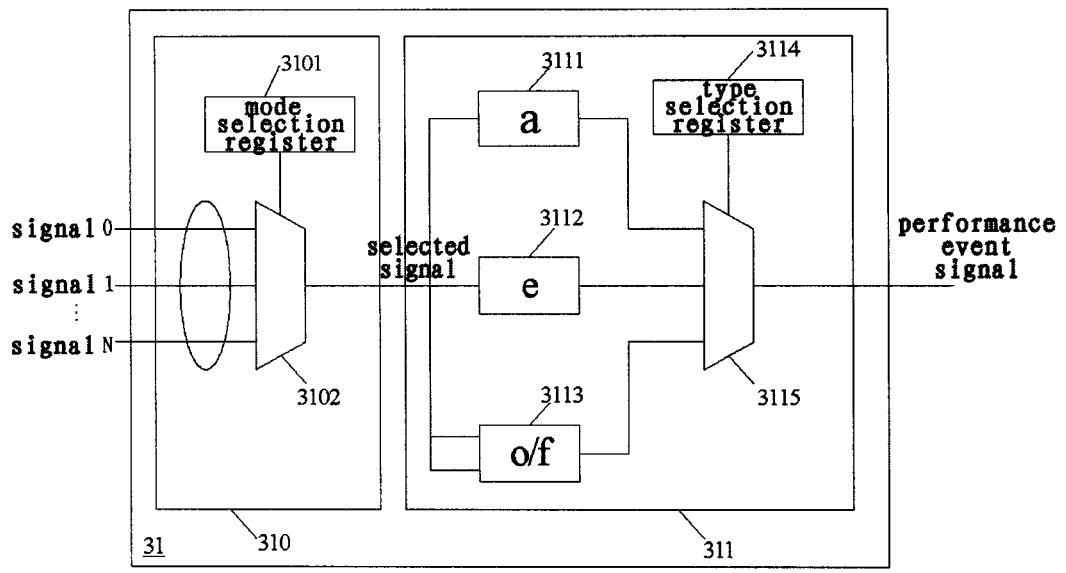
FIG. 4 is a schematic block diagram of a performance event detection apparatus in a data processing system according to an embodiment of the present invention.

The performance event detection apparatus 31 is configured to track various types of performance events in the circuitry to be monitored in the data processing system and notify the same to the performance event recording apparatus 32. The performance event detection apparatus 31 may have a structure as shown in FIG. 4, and its detailed particulars will be described below in detail.

Figure 6:
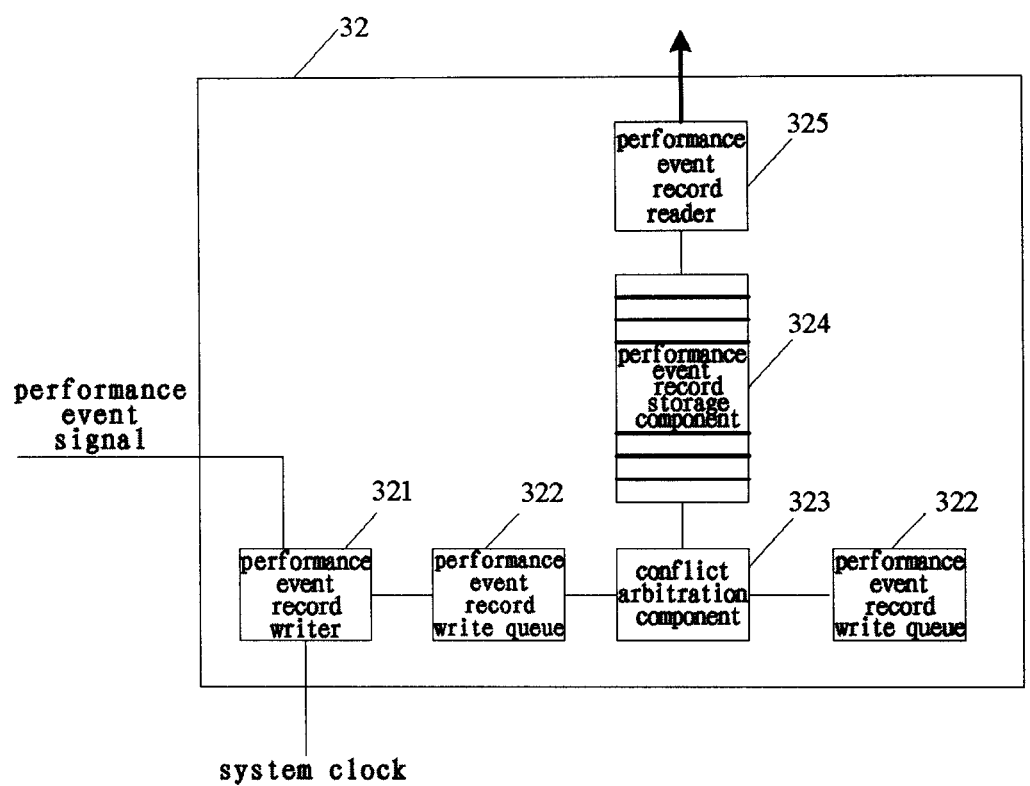
FIG. 6 is schematic block diagram of a performance event recording apparatus in a data processing system according to an embodiment of the present invention.
Figure 7:
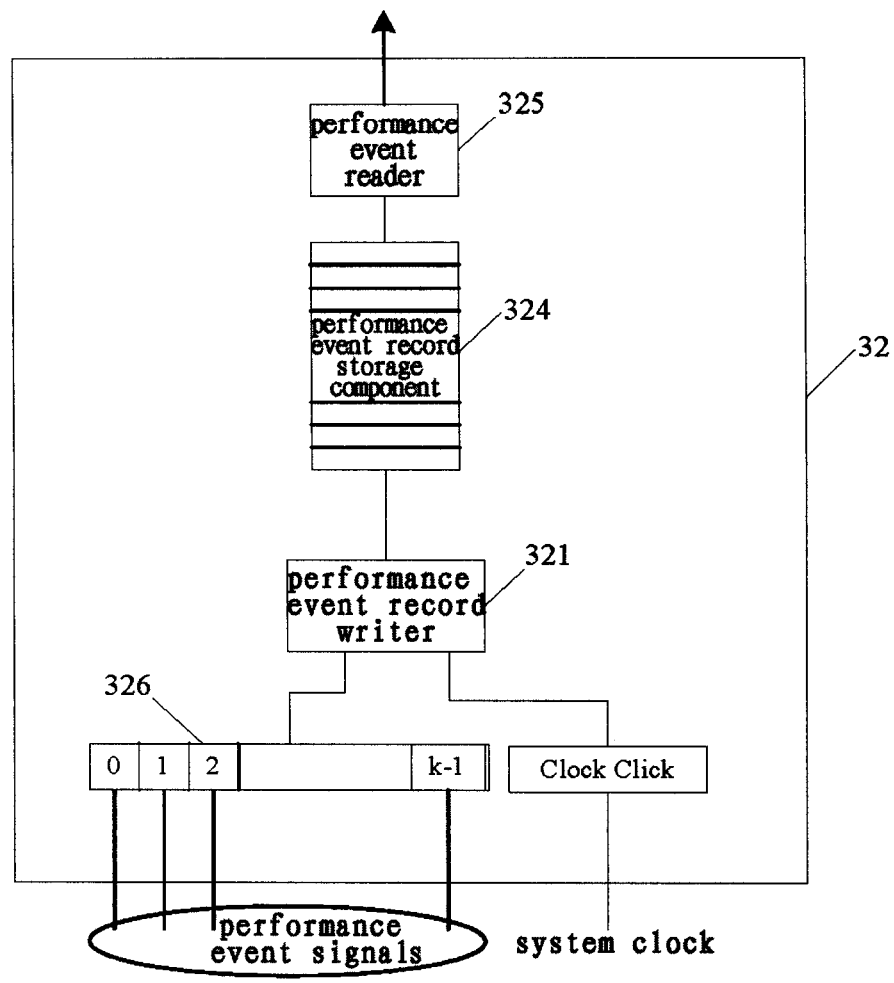
FIG. 7 is schematic block diagram of a performance event recording apparatus in a data processing system according to another embodiment of the present invention.

The performance event recording apparatus 32 is configured to record performance events monitored in the data processing system. The performance event recording apparatus 32 may have a structure as shown in FIG. 6 or FIG. 7. The performance event recording apparatus having a structure as shown in FIG. 6 or FIG. 7 may be selected correspondingly to be used depending on different data processing systems and circuitries to be monitored. The detailed particulars of the performance event recording apparatus will be described below in detail.

Figure 5:
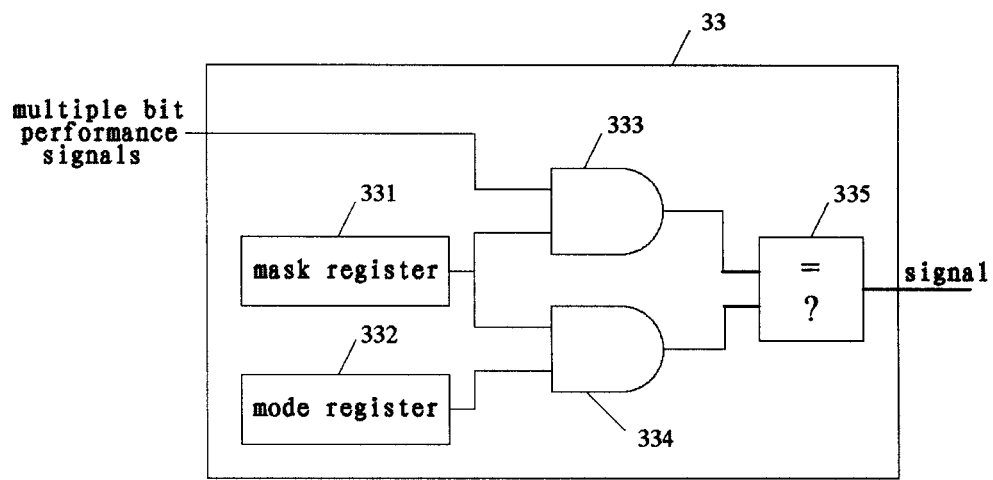
FIG. 5 is a schematic block diagram of a multiple bit performance signals combination apparatus in a data processing system according to an embodiment of the present invention.

Additionally, as shown in FIG. 3, the performance event monitoring system 30 of the embodiment may also optionally comprise a multiple bit performance signals combination apparatus 33. The multiple bit performance signals combination apparatus 33 is configured to combine multiple bit performance signals in the circuitry to be monitored in the data processing system into a single bit performance signal. When multiple bit performance signals in the circuitry to be monitored are associated with one another and can represent a single performance event, the multiple bit performance signals combination apparatus 33 may first be used to combine them into a single bit performance signal, which is then transmitted to the performance event detection apparatus 31 for the detection of performance events. The multiple bit performance signals combination apparatus 33 may have a structure as shown in FIG. 5, and its detailed particulars will be described below in detail.

Further, as shown in FIG. 3, a performance event record generated by the performance event monitoring system 30 of the embodiment is stored in a performance event log database 34 for use by a performance analysis application in the system in performance analysis of the data processing system.

Furthermore, when the performance event detection apparatus as shown in FIG. 4 is employed, the performance event recording apparatus of the performance event monitoring system of the present embodiment may also be an apparatus having any known structure capable of implementing the performance event recording.

Similarly, when a performance event recording apparatus as shown in FIG. 6 or FIG. 7 is employed, the performance event detection apparatus of the performance event monitoring system of the embodiment may also be an apparatus with any known structure capable of implementing the detection of performance events.

In addition, it needs to be pointed out that, while for the brevity of illustration, the performance event monitoring system 30 of the present embodiment as shown in FIG. 3 only comprises a single performance event detection apparatus 31, a single performance event recording apparatus 32 and a single multiple bit performance signals combination apparatus 33, in actual implementation, however, since the circuitry in a data processing system is very complex, and there may occur multiple thousands of performance events within a time slice for monitoring performance events, generally a plurality of such a performance event detection apparatus, performance event recording apparatus and multiple bit performance signals combination apparatus will be needed to accomplish the monitoring of so many performance events.

In the following, the performance event detection apparatus 31 in the performance event monitoring system of FIG. 3 will be described in detail in conjunction with FIG. 4.

FIG. 4 is a schematic block diagram of a performance event detection apparatus in a data processing system according to an embodiment of the present invention. As shown, the performance event detection apparatus 31 of the present embodiment comprises a signal line selection component 310 and a performance signal detection component 311.

The signal line selection component 310 is configured to select the signal line to be monitored in the data processing system in order for the performance signal detection component 311 to detect performance events.

In particular, as shown in FIG. 4, the signal line selection component 310 further comprises a mode selection register 3101 and a multiplexer 3102.

Wherein, the mode selection register 3101 is configured to determine through its configurable value which one of multiple lines of signal from the circuitry to be monitored may be transmitted through the multiplexer 3102 to the performance signal detection component 311. It is to be noted that the mode selection register 3101 may be read from and written to by software in the data processing system.

The multiplexer 3102 is configured to select a corresponding one from the multiple lines of signal from the circuitry to be monitored according to the configuration of the mode selection register 3101, as the line to be monitored for performance events.

It is to be noted that the signal line selection component 310 of the present embodiment is not limited to the above described structure, rather, any structure capable of implementing the selection of one line from multiple connected lines is suitable. For example, a corresponding logic switch circuit may also be used to implement the selection of a signal line, that is, each signal line may be connected to a logic switch circuit respectively, and during monitoring the corresponding logic switch circuit may be used to implement the selection of the signal line to be monitored.

Next, the performance signal detection component 311 is configured to detect signals on the signal line selected by the signal line selection component 310, and on detecting a performance event, activating the corresponding performance event signal to notify the performance event recording apparatus in the data processing system.

In particular, as shown in FIG. 4, the performance signal detection component 311 further comprises an atomic logic component 3111, an edge logic component 3112, a toggle or on/off logic component 3113, a type selection register 3114, and a multiplexer 3115.

Wherein, the atomic logic component 3111 is configured to perform atomic signal detection on the signal line selected by the signal line selection component 310, wherein the atomic signal detection is to detect the high (logical "one") of the selected signal in each cycle, and when the high of the selected signal is detected, to determine that an atomic performance event has occurred, thereby activating the signal detection logic for an atomic performance event signal representing the occurrence of an atomic performance event.

The edge logic component 3112 is configured to perform edge signal detection on the signal line selected by the signal line selection component 310, wherein the edge signal detection is to detect the rising edge and falling edge of the selected signal, and when such an rising edge or falling edge is detected, to determine that an edge performance event has occurred, thereby activating the signal detection logic for an edge performance event signal representing the occurrence of an edge performance event.

The toggle or on/off logic component 3113 is configured to perform toggle or on/off signal detection on the signal line selected by the signal line selection component 310, wherein the toggle or on/off signal detection is to detect the toggle or on/off of the selected signal, and when such a toggle or on/off is detected, to determine that a toggle or on/off performance event has occurred, thereby activating the signal detection logic for a toggle or on/off performance event signal representing the occurrence of a toggle or on/off performance event.

The type selection register 3114 is configured to determine through its configurable value to select which type of performance event signals, that is, to determine the performance event signals generated by which one of the atomic logic component 3111, the edge logic component 3112, and the toggle or on/off logic component 3113, are to be transmitted through the multiplexer 3115 to the performance event recording apparatus in the data processing system. It is to be noted that the type selection register 3114 can be read from and written to by software in the data processing system.

The multiplexer 3115 is configured to select the performance event signal generated by one of the atomic logic component 3111, the edge logic component 3112 and the toggle or on/off logic component 3113 according to the configuration of the type selection register 3114, and to notify the same to the performance event recording apparatus in the data processing system.

In the present embodiment, any one of the atomic logic component 311, the edge logic component 3113, and the toggle or on/off logic component 3113 may use a known structure capable of implementing the corresponding signal detection (atomic, edge, toggle or on/off) for signals.

The foregoing is a description of the performance event detection apparatus in a data processing system of the present embodiment. As described, the performance event detection apparatus 31 of the present embodiment first uses the signal line selection component 310 to select a signal line to be detected, and then uses the performance signal detection component 311 to perform the signal detection of a specified type on the selected signal line to be detected, in order to generate the corresponding performance event signal.

In the present embodiment, by providing a single signal line selection component for multiple signal lines to select a signal line and by providing a performance signal detection component to detect performance events on the selected signal line, the number of the needed performance signal detection components is reduced drastically as compared to the prior art in which a performance signal detection component is provided respectively for each signal line to detect performance events and a single signal line selection component is provided for multiple signal lines to select a signal line on which the performance events will be recorded, thus avoiding the tremendous waste of system resources, and lowering the design cost.

In addition, it is to be noted that the performance signal detection component 311 of the present invention is not limited to the above described structure, instead, any structure capable of implementing the detection of various types of performance events for a selected signal line is suitable.

Next, the multiple bit performance signals combination apparatus 33 in the performance event monitoring system as shown in FIG. 3 will be described in detail in conjunction with FIG. 5.

FIG. 5 is a schematic diagram of a multiple bit performance signals combination apparatus in a data processing system according to an embodiment of the present invention. As shown, the multiple bit performance signals combination apparatus 33 of the present embodiment comprises at least a mask register 331, a mode register 332, a logical AND component 333, a logical AND component 334 and a logic comparison component 335.

Wherein, the mask register 331 is configured to determine which bit signals in the multiple bit performance signals from the circuitry to be monitored may be used as effective bits for the detection of performance events. The configured value in the mask register 331 is preset based on the detection requirements for the multiple bit performance signals to be monitored, and can be read and written by software in the data processing system.

The mode register 312 is configured to determine the combination mode for the multiple bit performance signals to be monitored. Its configured value is preset based on the detection requirements for the multiple bit performance signals to be monitored, and can be read and written by software in the data processing system.

The logical AND component 333 is configured to perform a logical AND operation on the multiple bit performance signals from the circuitry to be monitored and the content of the mask register 331.

The logical AND component 334 is configured to perform a logical AND operation on the content of the mask register 331 and the content of the mode register 332.

The logic comparison component 335 is configured to determine whether the output values of the logical AND component 333 and the logical AND component 334 are equal. In particular, the logic comparison component 335 compares the output values of the logical AND component 333 and the logical AND component 334, and outputs a corresponding single bit signal according to the comparison result. For example, when the output values of the logical AND component 333 and the logical AND component 334 are equal, the logic comparison component 335 outputs a logical "high" signal, otherwise outputs a logical "low" signal. In addition, the output signal of the logic comparison component 335 can be inputted into the above described performance event detection apparatus as a performance signal for monitoring performance events.

In the foregoing, the multiple bit performance signals combination apparatus in a data processing system of the present embodiment has been described. The multiple bit performance signals combination apparatus of the present embodiment performs special processing for certain particular performance signals, and is suitable for scenarios where multiple lines of signals are associated with one another and together can reflect a performance event. In some circuitries of data processing systems, in many cases multiple lines of signals are associated with one another, and only when combined as a whole can they truly reflect a performance event. For example, in the case of multiple lines of signals from the status register of a processor, only changes of the multiple lines of signals in combination can reflect changes of the processor's status. However, performance event detection apparatuses and performance event recording apparatuses of the prior art can only realize the processing of a single line of signals, and thus their processing method are not very suitable for the case where multiple bit monitored signals are associated with one another. Therefore, using the multiple bit performance signals combination apparatus, multiple bit performance signals can first be processed and combined into a single bit signal, which is then delivered to the performance event detection apparatus for the detection of performance events, thus better performance event detection results can be achieved.

It is to be noted that the multiple bit performance signals combination apparatus 33 of the present embodiment is not limited to the above described structure, and any structure capable of combining signals on multiple bit signal lines into a single bit signal is applicable. For example, the structure can also employ only one logical AND component, that is, for example, keeping the logical AND component 333 between the mask register 331 and the input of the multiple bit performance signals and omitting the logical AND component 334 between the mask register 331 and the mode register 332. In this case, the result of the logical AND between the mask register 331 and the mode register 332 can be calculated and stored in advance, and when the logic comparison component 335 is to perform a comparison, be inputted into the logic comparison component 335 as a known result, thus the logic comparison component 335 can only receive the calculation result of the logical AND component 333.

Next, the performance event recording apparatus 32 in the performance event monitoring system of FIG. 3 will be described in detail in conjunction with FIG. 6-7.

FIG. 6 is a schematic block diagram of the performance event recording apparatus in a data processing system according to an embodiment of the present invention. As shown, the performance event recording apparatus 32 of the present embodiment comprises at least a performance event record writer 321, a performance event record write queue 322, a conflict arbitration component 323, a performance event record storage component 324 and a performance event record reader 325.

Wherein, the performance event record writer 321 is configured to generate a performance event record for an activated performance event signal transmitted from the performance event detection apparatus 31 in the data processing system, and write the performance event record into the performance event record write queue 322. Wherein, the performance event record comprises an identifier of the performance event record writer and the system clock at which the performance event signal was activated. Generally, the circuitry in a data processing system is very complicated, and within a time slice there may occur multiple thousands of performance events, thus generally multiple performance event detection apparatuses need to be provided in order to detect different circuits respectively, and so that the detected performance events are also specific types of performance events, and correspondingly multiple performance event record writers 321 and performance event record write queues 322 need to be provided in order to carry out the performance event recording in cooperation with different performance event detection apparatuses, and thus the performance events recorded by various performance event record writers are specific. Therefore, identifiers (indexes) need to be assigned to various performance event record writers 321 in order to differentiate these performance event record writers 321. At the same time, the activated performance event signals transmitted by the performance event detection apparatus 31 was generated under the control of the mode selection register 3101 and the type selection register 3114, while the two registers can be read and written by software in the data processing system, thus, when the mode selection register 3101 and the type selection register 3114 of a performance event detection apparatus 31 have already been configured with specific values by the software, through the identifier of the performance event record writer 321 associated with the performance event detection apparatus 31, it can be determined which one of the multiple signal lines of the circuitry to be monitored the performance event signal came from, as well as the type of the performance event signal. Therefore, the identifier of the performance event record writer in the performance event record can indicate the source and type of the performance event.

The performance event record write queue 322 is configured to buffer performance event records generated by the performance event record writer 321, and to request to write a performance event record in the queue into the performance event record storage component 324.

The conflict arbitration component 323 is configured to arbitrate the write conflict when multiple performance event write queues 322 request at the same time to write the performance events therein into the performance event record storage component 324, to determine which performance event record in the performance events is permitted to be written. As described above, in a data processing system generally multiple performance event record writers 321 and performance event record write queues need to be provided, thus, the conflict arbitration component 323 is necessary in order to solve the potential storage conflicts between various performance event record write queues.

The performance event record storage component 324 is configured to store the performance event record as permitted by the conflict arbitration component 323 and as requested to be written by the performance event record write queue. In the present embodiment, the performance event record storage component 324 is implemented by a FIFO (first-in first-out) buffer, which can be part of the memory or cache of the processor. Of course, it can also be implemented using other storage and in other ways depending on specific situations.

The performance event record reader 325 is configured to read a performance event record from the performance event record storage component 324 according to the needs of performance analysis in the data processing system.

In the foregoing, the performance event recording apparatus 32 in a data processing system of the present embodiment has been described. With the present embodiment, when a performance analysis application in the data processing system is used to perform system performance analysis based on the performance event records, the identifier of a performance event record writer allows the user to locate conveniently the monitored circuit the performance event record corresponds to, and the system clock information in the performance event record reflects accurately the occurrence time of the performance event in the monitored circuit, which is very important information for performance analysis. The performance event records of the present embodiment, used as a performance log of the system, can record performance events comprehensively and accurately, thus facilitating the performance analysis of the system.

It is to be noted that the performance event recording apparatus 32 of the present embodiment is not limited to the above structure, and any structure capable of implementing the recording of performance events based on the system clock is suitable. For example, in other embodiments, the performance event record write queues may be excluded.

FIG. 7 is a schematic block diagram of the performance event recording apparatus in a data processing system according to another embodiment of the present invention. As shown, the performance event recording apparatus 32 of the present embodiment comprises a bit mask register 326, a performance event record writer 321, a performance event record storage component 324 and a performance event record reader 325.

Wherein, the bit mask register 326 is configured to record whether a performance event monitored in the data processing system occurred or not. Wherein, each bit in the bit mask register 326 corresponds to one of the performance event signals monitored by the performance event detection apparatus in the data processing system, and when a performance event signal on this line is activated, the corresponding bit is set to the high level to reflect the occurrence of the performance event to which the performance event signal of the line corresponds. And, when one or more performance event signals to which one or more bits of the performance event signals in the bit mask register 326 correspond are activated, the performance event record writer 321 is activated to generate a performance event record according to the current status of the bit mask register 326.

The performance event record writer 321 is configured to, on being activated, generate a performance event record according to the current status of the bit mask register 326 and based on the current configuration (the mode selection in the performance event detection apparatus, etc.) and the system clock, and to store the same in the performance event record storage component 324. Wherein, the performance event record comprises the current content (current value) of the bit mask register 326 and the current system clock. Since the performance event signal to which each bit of the bit mask register 326 corresponds is specific, the performance event record generated directly based on the value of the bit mask register 326 can indicate intuitively which performance events occurred and which performance events did not occur at the time of the recording.

The performance event record storage component 324 is configured to store the performance event record generated by the performance event record writer 321. In the present embodiment, the performance event record storage component 324 can be implemented by a FIFO buffer, which can be part of the memory or cache of the processor. Of course, it can also be implemented using other storage and in other ways.

The performance event record reader 325 is configured to read a specified performance event record in the performance event record storage component 324 according to the needs of performance analysis in the data processing system.

In the foregoing, the performance event recording apparatus in a data processing system of the present embodiment has been described. The performance event recording apparatus of the present embodiment has all the advantages of the performance event recording apparatus of the previous embodiment. In addition, compared with the performance event recording apparatus as shown in FIG. 6, the performance event recording apparatus of the present embodiment is more suitable for the case where the number of performance events to be detected at the same time is small, while the performance event recording apparatus of FIG. 6 is suitable for the case where a large number of performance events need to be detected.

Under the same inventive concept, a performance event monitoring method in a data processing system of the present invention will be described in detail in conjunction with the drawings.

Figure 8:
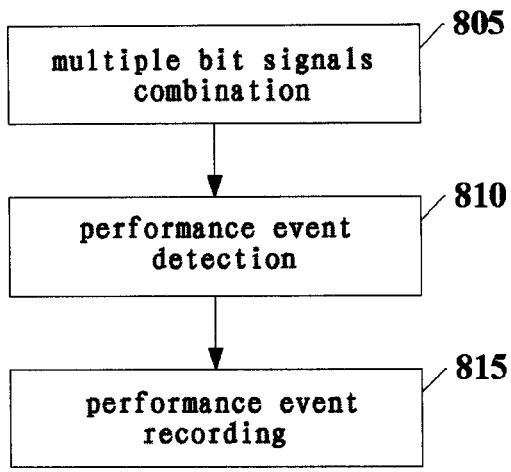
FIG. 8 is a flow diagram of a performance event monitoring method in a data processing system according to an embodiment of the present invention.

FIG. 8 is a flow diagram of a performance event monitoring method in a data processing system of the present embodiment. As shown, first in the optional step 805, multiple bit signals are combined into a single bit signal. It is to be noted that this step is not an indispensable step, and is only performed in the case where multiple lines of signals are associated and together are capable of reflecting a single performance event, while in other cases, it is not necessary.

In step 810, performance event detection is performed on signal lines to be monitored in order to track the occurrence of performance events.

In step 815, the detected performance event is recorded.

In the following, the method for combining multiple bit performance signals in step 805 of FIG. 8 will be described in detail in conjunction with FIG. 9.

Figure 9:
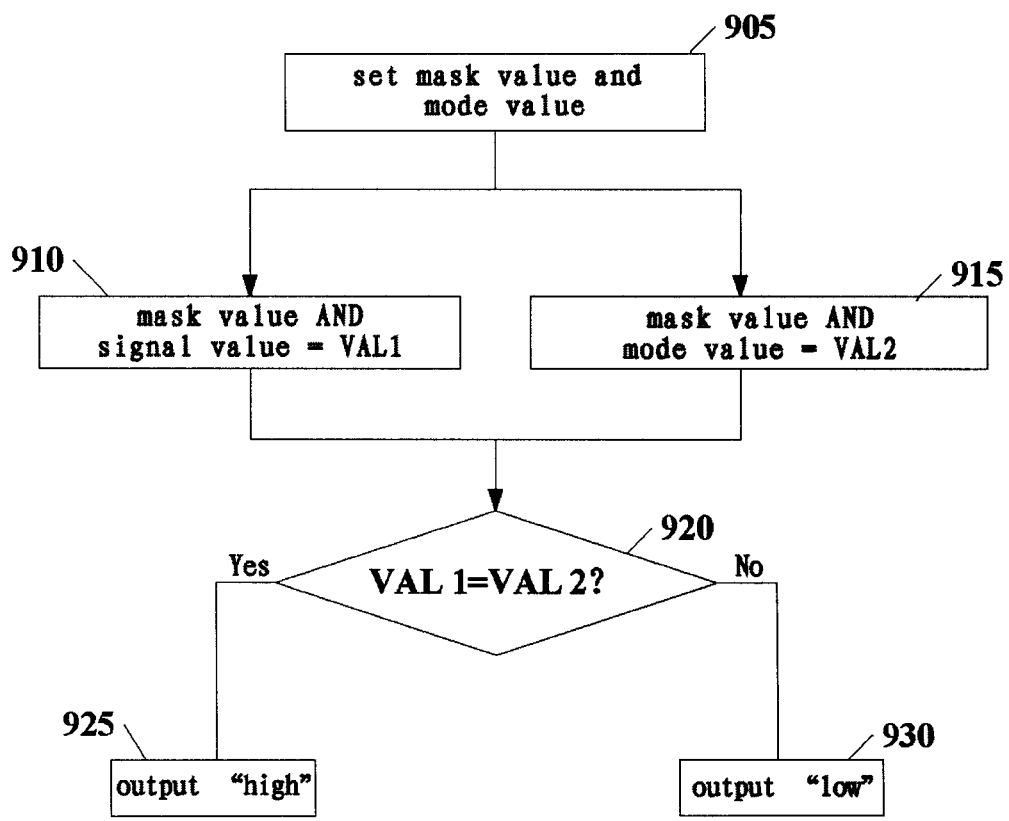
FIG. 9 is a flow diagram of a multiple bit performance signals combination method in a data processing system according to an embodiment of the present invention.

FIG. 9 is a flow diagram of a method for combining multiple bit performance signals in a data processing system according to an embodiment of the present invention. As shown, first in step 905, according to the detection requirements for associated multiple bit performance signals, the mask for determining the effective signal bits in the multiple bit performance signals and the combination mode for the multiple bit performance signals is set.

Next, in step 910, a logical AND operation is performed on the mask value and the value of the multiple bit performance signals to get a logical AND result VAL1.

In step 915, a logical AND operation is performed on the mask value and the mode value to get a logical AND result VAL2.

In step 920, it is determined whether the logical AND result VAL1 and logical AND result VAL2 are equal. If they are equal, a "high" is outputted in step 925, otherwise a "low" in outputted in step 930. Further, the output result can be provided to the performance event detection method described below as a signal to be detected.

In the foregoing, the multiple performance signals combination method in a data processing system of the present embodiment has been described. The multiple bit performance signals combination method is suitable to the situation where multiple lines of signals are associated and together can reflect a performance event. It is to be noted that the present invention has no special limitation in terms of the execution order of the steps, provided only that the purpose of the invention can be achieved.

Next, the performance event detection method in step 810 of FIG. 8 will be described in detail in conjunction with FIG. 10.

Figure 10:
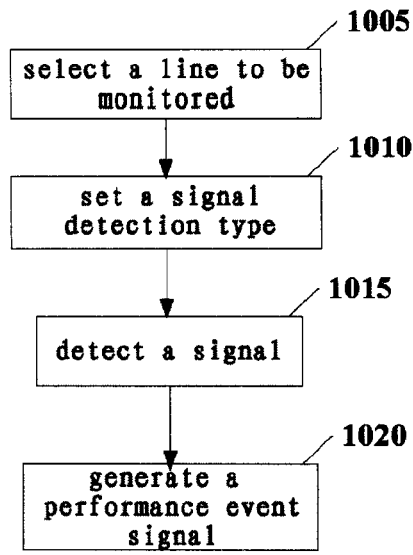
FIG. 10 is a flow diagram of a performance event detection method in a data processing system according to an embodiment of the present invention.

FIG. 10 is a flow diagram of a performance event detection method in a data processing system according to an embodiment of the present invention. As shown, first in step 1005, a signal line to be monitored in the data processing system is selected.

In step 1010, the signal detection type is set for the selected signal line.

In step 1015, signal detection of the set type is performed on the selected signal line. In particular, in the present embodiment, the following three types of signal detection is implemented: atomic signal detection, edge signal detection, toggle or on/off signal detection. These three types of signal detection have already been described above in detail, and will not be repeated here.

In step 1020, a corresponding performance event signal is activated based on the detected performance event.

In the foregoing, the performance event detection method in a data processing system of the present embodiment has been described. In the present embodiment, first the signal line to be detected is selected, then signal detection of a specified type is performed on the selected signal line to be detected, in order to generate a corresponding performance event signal. Compared with the prior art where performance event detection is first performed on various signal lines and then a signal line is selected for which performance events are to be recorded, the needed system resources and processing time are reduced drastically, thus avoiding tremendous waste of system resources, and lowering the design costs.

Next, the performance event recording method in step 815 of FIG. 8 will be described in detail in conjunction with FIGS. 11 and 12.

Figure 11:
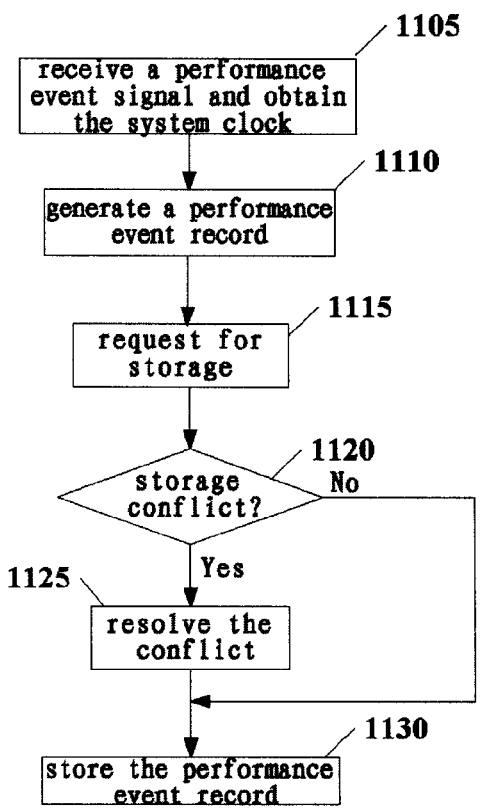
FIG. 11 is flow diagram of a performance event recording method in a data processing system according to an embodiment of the present invention.

FIG. 11 is a flow diagram of a performance event recording method in a data processing method according to an embodiment of the present invention. As shown, first in step 1105, a performance event signal activated in the data processing system is received, and at the same time, the current system clock is obtained.

In step 1101, a performance event record is generated for the received performance event signal based on the current system clock, the performance event record including information about the type of the performance event and the system clock at which the performance event occurs.

In step 1115, it is requested to store the generated performance event record.

In step 1120, it is determined whether there will be a conflict in performing the storage operation of the performance event record. In a data processing system, the number of lines to be monitored is very large, and sometimes multiple performance events may be detected at the same time and thus multiple performance event records are generated, so in the case that a single storage component is used for the storage, the storage conflict of multiple performance event records would be generated unavoidably.

In step 1125, the conflict is resolved.

In step 1130, the generated performance event record is stored.

Figure 12:
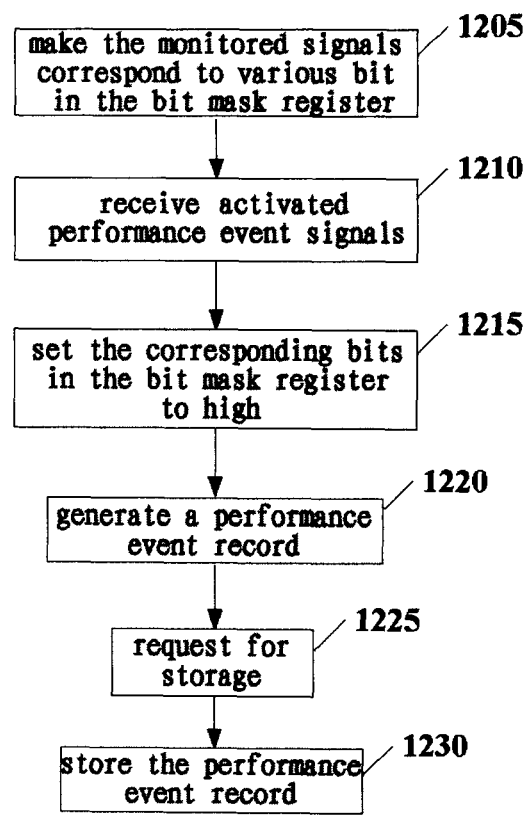
FIG. 12 is flow diagram of a performance event recording method in a data processing system according to another embodiment of the present invention.

FIG. 12 is a flow diagram of a performance event recording method in a data processing system according to another embodiment of the present invention. As shown in FIG. 12, first in step 1205, each of the performance event signals to be monitored in the data processing system is made to correspond to one bit in the bit mask register respectively.

In step 1210, an activated performance event signal in the performance event signals to be monitored in the data processing system is received.

In step 1215, the bit in the bit mask register corresponding to the activated performance event signal is set to high, in order to activate the recording of the performance event.

In step 1220, the current system clock is obtained, and a performance event record is generated based on the current content of the bit mask register, wherein the performance event record include the current value of the bit mask register and the current system clock.

In step 1225, the request is made to store the generated performance event record.

In step 1230, the generated performance event record is stored.

In the foregoing, the performance event recording method in a data processing system of the present embodiment has been described. With the present embodiment, when using a performance analysis application in the data processing system to perform system performance analysis based on the performance event records, the user can locate conveniently the monitored circuit to which a performance event record corresponds, and the system clock information in the performance event record reflects accurately the occurrence time of the performance event in the monitored circuit, which is a very important information for performance analysis. Using the performance event records in the present embodiment as a performance log of the system, the performance events can be recorded comprehensively and accurately, thus facilitating the performance analysis of the system.

While in the foregoing a performance event monitoring system and method in a data processing system, a performance event recording apparatus and method, a performance event detection apparatus and method, and a multiple bit performance signals combination apparatus and method in a data processing system of the present invention have been describe in detail through some illustrative embodiments, these embodiments are not exhaustive, and various changes and modifications can be made by those skilled in the art within the spirit and scope of the present invention. Therefore, the present invention is not limited to these embodiments, and the scope of the present invention is solely defined by the appended claims.

The invention claimed is:

1. An apparatus in a data processing system, comprising:
a plurality of single bit performance event record generation components that generate performance event records according to a system clock for a performance event monitored in a data processing system;
a bit mask register that combines multiple bit performance signals into a single bit output signal and records whether a performance event to be monitored in the data processing system occurred, the multiple bit performance signals including multiple lines of signals associated with one another that, in combination, reflect the performance event to be monitored;
a performance event record storage component that receives the single bit output signals from the plurality of single bit performance event record generation components and that stores the performance event record generated by at least one of the plurality of performance event record generation components; and
a conflict arbitration component that arbitrates the storage conflict when said multiple performance event record generation components request to store their generated performance event records into the performance event record storage component at the same time, in order to determine the storage order of the performance event records of these performance event generation components.

2. The apparatus as claimed in claim 1, wherein the performance event record generation component further comprises:
a performance event record writer for generating a performance event record based on the system clock for an activated performance event signal representing the occurrence of a performance event in the data processing system, and for writing the performance event record into the performance event record storage component.

3. The apparatus as claimed in claim 2, wherein the performance event record generation component further comprises:
a performance event record write queue for buffering performance event records generated by the performance event record writer.

4. The apparatus as claimed in claim 2, wherein the performance event record generated by the performance event record writer comprises an identifier of the performance event and the information of the system clock at which the performance event occurred.

5. The apparatus as claimed in claim 1, wherein the performance event record generation component further comprises:
a performance event record writer for generating a performance event record based on the system clock for a performance event occurring as recorded in the bit mask register, and for writing the performance event record into the performance event record storage component.

6. The apparatus as claimed in claim 5, wherein each bit in the bit mask register corresponds to a line of performance event signals, and when a performance event signal in this line is activated, this bit is reset to identify the occurrence of the corresponding performance event and to activate the performance event record writer to generate a performance event record.

7. The apparatus as claimed in claim 5, wherein the performance event record generated by the performance event writer comprises the current content of the bit mask register and the current system clock information.

8. The apparatus as claimed in claim 1, further comprising:
a performance event record reader for reading a specified performance event record from the performance event record storage component.

9. The apparatus as claimed in claim 1, further comprising:
a signal line selection component for selecting a signal line to be detected in the data processing system; and
a performance event detection component for detecting performance events on the selected signal line, and for activating the corresponding performance event signal on detection of a performance event to notify the performance event recording apparatus in the data processing system.

10. The apparatus as claimed in claim 9, wherein the signal line selection component further comprises:
a mode selection register for determining a signal line to be detected in multiple signal lines through its configurable value; and
a multiplexer for selecting a corresponding one from the multiple signal lines according to the configuration of the mode selection register, as the line to be detected.

11. The apparatus as claimed in claim 9, wherein the performance event detection component comprises:
an atomic logic component for performing atomic signal detection on the selected signal line and for generating a corresponding performance event signal;
an edge logic component for performing edge signal detection on the selected signal line and for generating a corresponding performance event signal;
a toggle or on/off logic component for performing toggle or on/off signal detection on the selected signal line and for generating a corresponding performance event signal; and
a signal type selection component for selecting the performance event signal generated by one of the atomic logic component, the edge logic component and the toggle or on/off logic component, and notifying the same to the performance event recording apparatus in the data processing system.

12. The apparatus as claimed in claim 11, wherein the signal type selection component further comprises:
a type selection register for determining the performance event type to be selected through its configurable value; and
a multiplexer for selecting the performance event signal generated by a corresponding one of the atomic logic component, the edge logic component and the toggle or on/off logic component based on the configuration of the type selection register, to notify the selected performance event signal to the performance event recording apparatus in the data processing system.

13. A method in a data processing system, comprising:
in each of a plurality of single bit apparatuses, generating a performance event record based on the system clock for a performance event monitored in the data processing system;
receiving a single bit output, in apparatus, from each of the plurality of single bit apparatuses generating a performance record, storing the generated performance event record;
recording, in apparatus, whether a performance event to be monitored in the data processing system has occurred using a bit mask register, the bit mask register combining multiple bit performance signals into a single bit output, wherein the multiple bit performance signals include multiple lines of signals associated with one another that, in combination, reflect the performance event to be monitored; and
receiving the single bit outputs, in apparatus, and arbitrating the storage conflict when multiple performance event records are generated and received at the same time in the step of generating a performance event record, in order to determine the storage order of the performance event records.

14. The method as claimed in claim 13, wherein each of the performance event signals to be monitored in the data processing system corresponds to one bit in a bit mask register respectively, and the step of generating a performance event record comprises:
generating a performance event record based on the system clock and the current content recorded in the bit mask register.

15. The method as claimed in claim 13, further comprising:
reading the performance event records for system performance analysis.

16. The method as claimed in claim 13, wherein the performance event record comprises an identifier indicating the type of the performance event and the information of the system clock at which the performance event occurred.

17. The method as claimed in claim 13, further comprising:
selecting a signal line to be monitored in the data processing system; and
detecting performance events on the selected signal line and activating a corresponding performance event signal on detection of a performance event, in order to record the performance event.

18. The method as claimed in claim 17, wherein the step of detecting performance events further comprises:
performing an atomic signal detection on the selected signal line to generate a corresponding performance event signal;
performing an edge signal detection on the selected signal line to generate a corresponding performance event signal;
performing a toggle or on/off signal detection on the selected signal line to generate a corresponding performance event signal; and
selecting the performance event signal generated in one of the steps of atomic signal detection, edge signal detection and toggle or on/off signal detection for recording the performance event.

* * * * *